United States Patent

Wu et al.

(10) Patent No.: US 8,945,640 B2
(45) Date of Patent: Feb. 3, 2015

(54) GENIPIN-RICH MATERIAL AND ITS USE

(71) Applicants: Shaowen Wu, Cincinnati, OH (US); Gregory Horn, Wyoming, OH (US)

(72) Inventors: Shaowen Wu, Cincinnati, OH (US); Gregory Horn, Wyoming, OH (US)

(73) Assignee: WILD Flavors, Inc., Erlanger, KY (US)

( * ) Notice: Subject to any disclaimer, the term of this patent is extended or adjusted under 35 U.S.C. 154(b) by 0 days.

(21) Appl. No.: 13/670,874

(22) Filed: Nov. 7, 2012

(65) Prior Publication Data

US 2013/0115252 A1    May 9, 2013

Related U.S. Application Data

(60) Provisional application No. 61/556,441, filed on Nov. 7, 2011.

(51) Int. Cl.

| A61K 36/74 | (2006.01) |
| A61K 9/00 | (2006.01) |
| A23L 1/00 | (2006.01) |
| A23L 1/015 | (2006.01) |
| A23L 1/275 | (2006.01) |
| A23L 1/212 | (2006.01) |

(52) U.S. Cl.
CPC ............ *A23L 1/0029* (2013.01); *A23L 1/0152* (2013.01); *A23L 1/2751* (2013.01); *A23L 1/212* (2013.01)
USPC ............................ 424/777; 424/725; 424/400

(58) Field of Classification Search
CPC ................................ A61K 36/74; C09B 61/00
See application file for complete search history.

(56) References Cited

U.S. PATENT DOCUMENTS

| 4,247,698 A * | 1/1981 | Toyama et al. ............... 546/112 |
| 4,983,524 A | 1/1991 | Fujikawa et al. |
| 7,927,637 B2 | 4/2011 | Echeverry et al. |
| 8,283,322 B2 | 10/2012 | Slusarewicz et al. |
| 2008/0195230 A1 | 8/2008 | Quijano et al. |
| 2009/0246343 A1* | 10/2009 | Wu et al. ...................... 426/540 |
| 2010/0183699 A1 | 7/2010 | Wan et al. |
| 2010/0196298 A1* | 8/2010 | Andre et al. ................... 424/63 |
| 2011/0082199 A1 | 4/2011 | Hedman |
| 2012/0189584 A1 | 7/2012 | Schek et al. |

FOREIGN PATENT DOCUMENTS

| CA | 2458821 | 3/2003 |
| CN | 101899484 | 12/2010 |
| CN | 102399370 | 4/2012 |
| EP | 2093256 | 8/2009 |
| KR | 20010096213 | 11/2001 |
| WO | WO 2012/048188 | 4/2012 |

OTHER PUBLICATIONS

Djerassi et al. (1960) J. Organic Chem. 25(12) pp. 2174-2177.*
Morton, J. (1987) Genipap, p. 441-443. In: Fruits of warm climates. Julie F. Morton, Miami, FL.*
English Abstract and Machine Translation of Chinese Patent CN 101899484.
English Abstract of Chinese Patent CN 102399370.
English Abstract of Korean Patent KR 20010096213.

* cited by examiner

*Primary Examiner* — Chris R Tate
*Assistant Examiner* — Russell Fiebig
(74) *Attorney, Agent, or Firm* — Frost Brown Todd LLC

(57) ABSTRACT

A method of preparing genipin-rich materials from the fruit of *Genipa americana* fruit for their use as a cross-linking agent and as a raw material to produce colors is disclosed. The genipin-rich materials can be used in a broad range of applications including personal care, cosmetics, dietary supplements, packaging, textiles, beverages, foodstuffs, drugs, and animal feeds.

4 Claims, 1 Drawing Sheet

Process for Preparing Genipin-Rich Extract
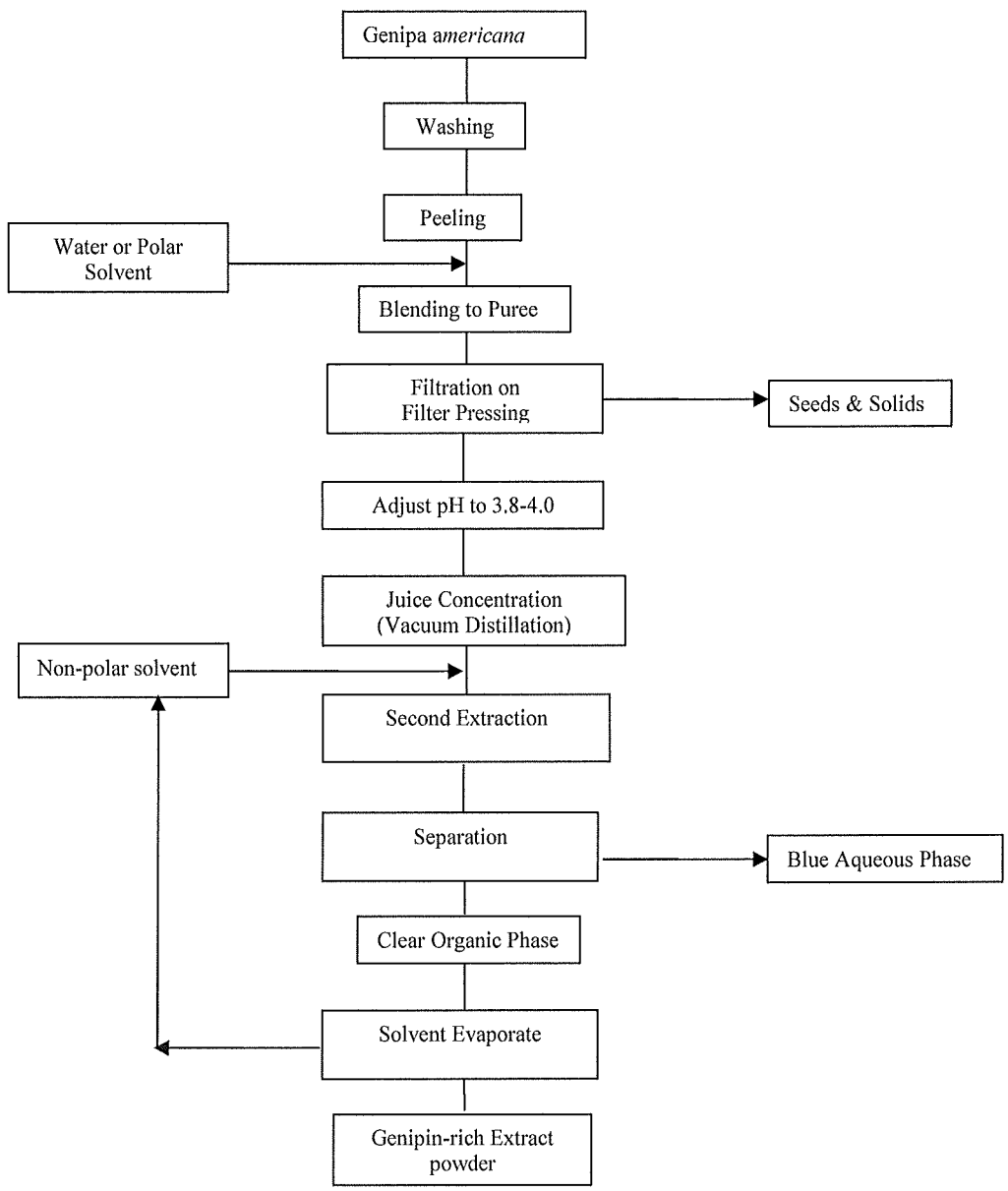

GENIPIN-RICH MATERIAL AND ITS USE

This application is based on and claims priority from U.S. Provisional Application Ser. No. 61/556,441, Wu and Horn, filed Nov. 7, 2011, incorporated herein by reference.

TECHNICAL FIELD

This invention refers to novel off-white genipin-rich materials and their use as cross-linking reagents and for colorant development. More specifically, the present invention relates to a method for producing novel genipin-rich materials from the fruit of *Genipa americana*; the genipin-rich material contains genipin up to 97% w/w which enables its use as agents for cross-linking and as raw materials for colorant production.

BACKGROUND

Today, synthetic chemicals, such as colorants or cross-linking reagents, tend to have decreasing acceptance in the food, cosmetic, animal feed and textile industries. For safety reasons, whether real or perceived, people tend to favor the use of natural or organic ingredients in food, cosmetic, textile, and biomaterial products.

Genipin is a colorless compound. It belongs to the iridoid group. It is very active chemically and reacts immediately when combined with compounds having primary amine groups, such as amino acids, collagen, chitosan, glucosamine-type compounds and various proteins and enzymes. When oxygen is present, the product may turn to blue, green, or black quickly. Genipin is an iridoid ester, therefore, it can be hydrolyzed to generate genipinic acid which also can react with different compounds to generate red and brown colorants. The colorants generated from genipin are heat and pH stable. Since genipin normally comes from plant materials, its Kosher characteristics provide great potential for use of genipin-derived colorants in bakery and canned food applications.

Large amount of iridoids, such as geniposide, gardenoside, genipin-1-b-gentiobioside, geniposidic acid and genipin, can be found in *Gardenia jasminoides* Ellis fruit. Geniposide, an iridoid glycoside, is a main component comprising 7-8% of fruit weight, while only trace amounts of genipin naturally exist in the *Gardenia* fruit. Historically, the iridoids in *Gardenia* fruit were extracted from the fruit with methanol or ethanol, and then separated as yellow pigment on active carbon, and treated with enzymes having beta-glucosidic activity or proteolytic activity to convert glycoside iridoids to aglycone form, genipin or genipinic acid. Then, genipin or genipinic acid can be reacted with other compounds to produce colorants (KR1020010096213A).

Genipin and other iridoid compounds, such as genipinic acid, genipin-gentiobioside, geniposide and geniposidic acid, are found also in the fruits and leaves of *Genipa americana*, also known as Genipap, or Huito, a tropical wild plant. Genipin is naturally present in the mature fruit, and its quantity is from 0 to 3.0% of fruit weight depending on the degree of ripeness. Genipin is stable in the plant cell even though it is not established where it is stored. Whenever the cell is broken, genipin will react spontaneously with the amino acids that naturally exist in the fruit pulp and turn color to blue or black in an air environment. In our previous patent application (US20090246343A1), we made coloring (blue) fruit juice by mixing *Genipa americana* fruit pulp with juices from other fruits or vegetables. The natural acid-stable blue juice has been used broadly in the food and beverage industries. Lopes et al. (U.S. Pat. No. 7,927,637B2) used unprocessed raw juice obtained from *Genipa americana* fruit pulp, and mixed with glycine or with glycine plus starch, to make blue colorants. Patrice Andre and co-worker (US20100196298A1) used coloring materials obtained from the plant extraction of *Genipa americana, Gardenia jasminoides, Rothmannia, Adenorandia* or *Cremaspora*, bound to a solid substrate, to make cosmetic compositions.

Genipin not only can generate colorants, but also can act as a good cross-linking agent. Campbell et al. discovered a new biodegradable plastic polymer involving genipin as cross-linking agent (EP2093256A2). Such plastics are useful in biological systems for wound repair, implants, stents, drug encapsulation and delivery, and other applications. Fujikawa et al. claimed (U.S. Pat. No. 4,983,524) the use of iridoid aglycone, genipin, as a cross-linking agent to produce immobilized enzyme on beads for food industry. Quijano, R and Tu, H (US 20080195230A1) disclosed the use of genipin to fix whole, natural tissues to reduce antigenicity and immunogenicity and prevent enzymatic degradation of the tissue when implanted in a host.

However, pure genipin production historically involves many steps, including HPLC separation, and currently its cost is high. No description in the art teaches the preparation of a stable genipin-rich extract from *Genipa americana* plant, and its broad applications as natural colorants and cross-linking agent in foods, drugs, nutritional supplements, personal care products, cosmetics, animal feed, textiles, polymers, and in the biomaterial industries.

SUMMARY

The present disclosure provides a method of producing stable genipin-rich extracts from the *Genipa americana* plant. The process involves aqueous or polar solvent extraction and non-polar organic solvent extraction; the powder formed is a genipin-rich extract with an off-white color and has genipin content up to about 97%.

The present disclosure further provides applications of the genipin-rich extracts in natural colorant production and forming polymers for use in a broad range of areas, such as in foodstuffs, drugs, nutritional supplements, personal care products, cosmetics, animal feed, textiles, biodegradable polymers, and biomaterials production. Examples of such uses are to be found in numerous patent documents, including U.S. Pat. No. 8,283,222, CN101899484, US20120189584, WO2012048188, CN102399370, CA2458821, DE602007013718, US20110082199, TW1334878, US20100183699, and such documents are incorporated herein by reference.

As used herein, all ratios and proportions noted are "by weight" unless otherwise specified. In addition, all patents, patent applications and technical publications cited are incorporated herein by reference.

BRIEF DESCRIPTION OF THE DRAWINGS

FIG. 1 is a flow chart representation of an embodiment of the process for making genipin-rich extract produced from *Genipa americana* fruit.

DETAILED DESCRIPTION

The present disclosure provides a method of producing stable genipin-rich extracts from the *Genipa americana* plant. The process involves aqueous or polar solvent extraction and organic non-polar solvent extraction. The resulting powder form of genipin-rich extract is off-white in color and has genipin content up to about 97%. The present disclosure further provides applications of the genipin-rich extracts in the production of natural heat-stable colorants and as a new cross-linking agent for use in a broad range of areas, such as foodstuffs, drugs, nutritional supplements, personal care products, cosmetics, animal feed, textiles, biodegradable polymers, and biomaterial production.

Starting Materials

The starting materials used in this process are fruits or leaves from a plant of *Genipa americana* L. which is also known by numerous informal names: genipap, huito, jaguar, bilito, cafecillo denta, caruto, caruto rebalsero, confiture de singe, danipa, genipa, génipa, genipayer bitu, guaitil, guaricha, guayatil colorado, huitol, huitoc, huitu, irayol, jagua blanca, jagua amarilla, jagua colorado, jeipapeiro, juniper, maluco, mandipa, marmelade-box, nandipa, ñandipa genipapo, tapaculo, tapoeripa, taproepa totumillo, yagua, yanupa-i, yenipa-i, yenipapa bi, genipapo, huitoc, vito, chipara, guanapay, or other varieties such as jenipaporana, or jenipapo-bravo, etc. The fruit is optimal for harvest when mature in size, firm, and green to greenish brown in color.

Materials may be whole fruit, fruit pulp, fruit juice, fruit puree, fruit juice concentrate, dried powder from fruits or juice, water-insoluble part of fruit, and leaves from *Genipa americana* L.

Process for Genipin-Rich Extraction

In order to produce the genipin-rich extracts of the present invention, the mature fruits of *Genipa americana* are processed with water or polar solvent in about 1:0.5-5.0 (by weight) ratios depending on extraction efficiency, preferably from about 1:1-1.5 ratios. After washing and/or blanching, the fruit is peeled and cut into pieces; then milled or blended with water or polar solvents; extracted with or without heating, the pulp, seeds and skin are separated by filtration; and liquid is collected. Extraction may take place for up to about 1 hour, preferably about 15-30 min, at a temperature of about 15-40° C. The water or polar solvent extraction from fruit pulp of *Genipa americana* may be repeated 1-3 times. Then, the pH of polar solvent extracts is measured and adjusted to about 3.8-4.0 using acids. Concentration can be performed on a rotary evaporator with vacuum and temperature set at about 40-46 C. The solid content in the concentrate may be greater than 15% w/w, preferably about 40-70% w/w.

Next, the aqueous extract or the concentrated genipin-rich aqueous extract may be further extracted with non-polar organic solvents involving suitable mixing (by shaking or agitation) in a ratio of about 1:1. Those non-polar organic solvents have a polarity index from about 0 to 5.0 and water solubility less than about 30%. The organic solvent phase is then separated from aqueous phase by settling and siphoning the top organic layer or by using a high speed centrifuge. Non-polar solvent extraction may be repeated 2-3 times depending on the extraction efficiency. The genipin-rich extracts may subsequently be dried by evaporation and organic solvent can be recycled and reused for genipin extraction. The remaining yellow or off-white solid is a genipin-rich extract in which genipin content is at least about 70% w/w of the solids.

Alternatively, the mature fruits of *Genipa americana* are processed with organic solvents directly in a ratio of about 1:1-2. After washing and/or blanching, the fruit is peeled and cut into pieces, then milled or blended, extracted with non-polar organic solvent directly, with or without heating, the pulp, seeds and skin are separated and the solvent extract is collected. Extraction may take place for up to about 1 hour, preferably about 15-30 min at temperature of about 18-25° C. The organic solvent extraction may be repeated 2-3 times depending on the extraction efficiency. The genipin-rich extracts may subsequently be dried using an evaporator and condenser, and organic solvent can be recycled and reused. The resulting off-white or yellow solids is genipin-rich extract that contains genipin at greater than about 40% w/w of solid.

Genipin-rich extracts may be aqueous or polar solvent extracts obtained from the starting material sources described. Polar solvents include those with water solubility up to 100% and polarity index greater than about 5.0, such as water, acetic acid, methanol, ethanol, n-propanol, iso-propanol, dimethyl sulfoxide, dimethyl formamide, acetonitrile, acetone, dioxane tetrahydrofuran, etc., or acetic, citric, phosphate acid buffer solutions, or mixtures thereof in different ratios. This list is not intended to limit the solvent used, however considering food safety, water, ethanol, n-propanol, iso-propanol, methanol and acetic, citric and phosphate acid buffer solutions, are preferred for food uses of the extract.

Genipin-rich extracts may alternatively be organic solvent extracts obtained from aqueous or polar solvent extracts described above. Non-polar organic solvents include those with less than about 30% of water solubility and a polarity index from 0 to about 5.0, such as ethyl acetate, butyl acetate, n-butanol, diethyl ether, hexane, 2-butanone, chloroform, 1,2-dichloroethane, benzene, xylene, methyl-t-butyl ether, toluene, carbon tetrachloride, trichloroethylene, cyclohexane, pentane, and heptane, or mixtures thereof in different ratios. This list is not intended to limit solvent used, however considering food safety, ethyl acetate, butyl acetate, and n-butanol are preferred.

Genipin-rich extracts may alternatively be organic solvent extracts obtained from the starting material sources described. Organic solvents include those with polarity index less than about 6.0, and mixtures thereof in different ratios. The solvent or solvent mixture with low solubility in water is preferred in order to obtained colorless genipin-rich extracts.

Methods used for solid-liquid separation can be, for example, regular filtration, centrifugation, press filtration, and membrane cartridge filtration. The liquid-liquid separation can be done, for example, by using high speed centrifuge, or by settling and siphoning the required liquid layer.

Acids used for pH adjustment can be any organic or inorganic acids, selected to be suitable for the intended end use.

Concentration can be performed by any method known in the art, for example, by evaporation using a rotary vacuum evaporator, a flash evaporator, an osmosis filtration device, or an ultra-filtration device with a suitable membrane.

Properties of Genipin-Rich Extract

Genipin-rich extract is an off-white powder or crystals. Some batches may have a slightly yellowish or greenish tint if purity is relatively low. The genipin content can be up to about 97% (w/w) depending on the extraction method. No geniposide, geniposidic acid, or other iridoid compounds were found in genipin-rich extract when analyzed by HPLC. The remainder of the composition of the genipin-rich extract is mainly moisture, fat, and also small amounts of acids and nitrogen-containing compounds, with the balance being carbohydrates, as noted in the following table.

Specification of Genipin Rich Material

| | |
|---|---|
| Genipin | 30-97% |
| Fatty Acids | <1.0% |
| Fat | <5.0% |
| Protein | <1.0% |
| Organic Acids | <0.5% |

HPLC methods can be used to determine genipin content and perform other iridoid analysis.

Genipin content of the off-white genipin-rich powder is stable when stored at refrigerated temperatures. Genipin level decreased by less than about 5% after 3 months of storage. However, when mixing genipin-rich extract with compounds having a primary amine group, genipin will quickly react and generate colorants and/or polymers.

High genipin content extract readily dissolves in alcohol, alcohol-water mixtures, or hot water. Its solubility in cold water is limited.

Colorant Production

The present invention also provides a method of manufacturing a blue colorant by using the genipin-rich extract reaction and mixing with water and amino acids, for example (but not limited to), lysine, histidine, arginine, glutamine, asparagine, methionine, glycine, glutamic acids, tyrosine, valine, alanine, serine, leucine, taurine, carnitine, ornithine and citrulline, in the presence of oxygen. Heating can be used to accelerate the reaction speed. The molar ratios of genipin-rich extract to amino acids are from about 1:0.5 to about 1:10. The blue shades generated are variable among deep blue, violet-blue, bright-blue, and greenish-blue depending on the amino acid used. The blue colorant generated from genipin-rich extract is a heat- and acid-stable pigment.

Similar blue colorants also can be generated by reaction of the genipin-rich extract with other extracts, fruit and vegetable juices, plant and animal materials, including dairy and egg products, which contain amino acids, polypeptides, proteins, and compounds with one or more primary amine groups. The blue color also can be generated by reaction of the genipin-rich extract with collagen, gelatin, chitosan, enzymes, and microbes. The colorant produced can be further concentrated or deposited on clay or other carriers and used in foods, cosmetic (toothpaste, makeup, hair dye, etc), and textile (clothes) applications.

The present invention provides a method of manufacturing a red colorant by using the genipin-rich extract. The genipin-rich extract is hydrolyzed to remove a methyl group and convert the genipin to genipinic acid which further reacts with amine-containing compounds, with extra organic acid present and under anaerobic conditions, to generate red pigment. Heating can be used to accelerate red pigment formation. The red solution can be further purified on an ion exchange column and the eluted material can be concentrated on a rotary vacuum evaporator. The genipa red is a heat-stable pigment, and is also stable at a high pH.

Genipin-rich extract can be dispersed or dissolved in about 5-50% ethanol, preferably about 5-15% ethanol, and about 0.5-1.5 N sodium hydroxide or potassium hydroxide solution, to a concentration of extract of about 5-10% w/w. Hydrolysis can be performed with or without heating for from about 30 min to 24 hours, preferably about 2-10 hours under room temperature (~20° C.).

Hydrolyzed genipin-rich extract can be neutralized in pH by using acids, preferably organic acids, such as acetic acid, formic acid, lactic acid, citric acid, tartaric acid, adipic acid, oxalic acid, succinic acid, fumaric acid, and malic acid, preferably acetic acid and/or tartaric acid. The pH of hydrolyzed solution can be adjusted to the about 3.5-5.0 range.

The acidified solution is then heated to about 65-85° C., and preferably about 70-75° C., for about 5-120 minutes, preferably about 10-20 minutes. The insoluble brown by-products are removed since they will not contribute to red color formation. Precipitate separation can be accomplished by any of the filtration or centrifugation methods known in the art, for example, using regular filtration, centrifuge, press filtration, or tangential flow filtration or membrane cartridge filtration methods. Formation of the insoluble brown by-products can be further enhanced by the addition of calcium carbonate to adjust the pH to about 5-7.5 and mixing for about 5-30 minutes. Precipitation separation can be accomplished by the methods described above.

The clear solution described above can be adjusted to pH about 4.0-4.6 with organic acid or salt, preferably acetic acid and/or sodium acetate. Red color is generated after mixing with compounds having primary amine groups and heating to about 70-95° C., preferably about 80-85° C., for about 2 hours, or about 90-95° C., for about 1 hour. The compounds with primary amine groups can be selected from amino acids, such as alanine, arginine, lysine, aspartic acid, glutamic acid, glycine, histidine, valine, leucine, and serine. This listing is not intended to limit useful compounds with primary amine groups.

The present invention, in addition, provides a method of manufacturing green colorant by using the genipin-rich extract. Genipin-rich extract can react with certain amino acids, such as isoleucine, threonine, cysteine, and tryptophan, to generate green color. It also can react with primary amine-containing compounds and mix with carotenoids, annatto, and turmeric pigments to generate green color. Since genipa green can provide a heat resistant green shade, it is very useful in the food industry because of heat instability of the natural green pigment, chlorophyll.

Similar green colorants also can be generated by reaction of the genipin-rich extract with other extracts, fruit and vegetable juice, plant and animal materials, including dairy and egg products, which are rich in amino acids, for example, isoleucine, threonine, cysteine, and tryptophan. The green color also can be generated by reaction of the genipin-rich extract with collagen, gelatin, chitosan, enzymes and microbes and mixing with carotenoids, annatto, and turmeric pigments to generate green color. The colorant produced can be further concentrated or deposited on clay or other carriers and used in foods, cosmetic (toothpaste, makeup, hair dye, etc), and textile (clothes) applications.

The present invention, in addition, provides a means to generate other colorants, like purple, red, yellow, orange, brown, and black by using the genipin-rich extract. Purples and reds can be created by mixing genipin-rich extract with carmine, beet juice, and anthcyanin colorants and solution with amine-containing compounds. Oranges and yellows can be created by reacting genipin-rich extract with pentoses, such as xylose, ribose, or vitamin C. Black color shade can be generated when alkaline earth metals (e.g. magnesium or calcium), or metals with multi-valences are involved during genipin reaction with compounds containing a primary amine group.

Cross-Linking Agent

The present invention provides new materials which contain up to about 97% of genipin content. Genipin-rich extract can react with any compound that contains a primary amine group, such as collagen, gelatin, chitosan, glucosamine, and various enzymes and proteins, to form new texture materials used in, for example, the food, cosmetic, biomaterial, and polymer industries.

The present invention also provides a cross-linking agent obtained from the natural plant, *Genipa americana*, which can replace synthesized chemicals, such as glutaraldehyde, formaldehyde, glyoxal, malonaldehyde, succinaldehyde, epoxy compounds, etc. Genipin-rich extract used as a cross-linking agent has a much lower toxicity than those commonly used synthetic cross-linking reagents.

Genipin-rich extract can work as a natural cross-linking agent for encapsulation production in the food and pharmaceutical industries. Encapsulated materials can be nutritional ingredients, such as omega-3 oil, vitamin A, conjugated linolenic oil, or medicines. Gelatin, collagen, whey proteins, casein, chitosan, soy proteins, and other plant or animal proteins, are good starting materials in conjunction with the genipin-rich extract to use to make an encapsulation shell, film or micro-membrane. The products have good thermal and mechanical stability, as well as their biocompatible property.

Following examples are provided for purpose of further illustrating the present disclosure, but should in no sense be taken as limiting.

Example 1

A genipin-rich extract was generated based on the following process:
a) Huito fruits were peeled to yield 866.0 g of peeled fruit. The peeled fruit was cut into pieces and blended with 1300 g of deionized (DI) water and pureed with a blender to produce a puree;
b) the puree was allowed to stand for 15 min at room temperature; and the insoluble solid was separated from the aqueous extract by filtration. Then, 1212.4 g of DI water was added to the filtrate and mixed for 15 minutes followed by a second filtration step;
c) the filtrate was adjusted to pH<4.0 using citric acid, and concentrated to 25-55% (w/w) of solid content on a rotovapor;
d) then, the concentrated aqueous extract was extracted using ethyl acetate in a 1:1 ratio. The colorless or slightly yellow clear ethyl acetate layer was collected. This liquid-liquid extraction was repeated 2 times;
e) next, the combined ethyl acetate extract layers were evaporated on a rotovapor at a temperature of 40° C. and vacuum of 35 mm Hg to remove the solvent. Condensed ethyl acetate can be reused for genipin extraction. After evaporating the ethyl acetate, an off-white or slightly yellow powder was obtained. The powder contained 74.4% w/w of genipin.

Example 2

A genipin-rich extract was generated based on following process:
a) Huito fruits, 462 g, were peeled and blended with DI water 537 g to produce puree;
b) the puree was allowed to stand for 15 min at room temperature, and the insoluble solid was separated from aqueous extract by filtration. Then, the same quantity of DI water was added to the solid part, and the extraction step was repeated 2 times;
c) the combined aqueous extract was adjusted to pH<4.0 using citric acid and concentrated to 24.92% (w/w) of solid content via a rotovapor;
d) then, the concentrated aqueous extract was extracted using butyl acetate in 1:1 ratio. The colorless or slightly yellow clear butyl acetate layer was collected. This liquid-liquid extraction was repeated 2 times;
e) next, the combined butyl acetate extract was evaporated on a rotovapor at a temperature of 55° C. and vacuum of 35 mm Hg to remove the solvent. Condensed butyl acetate can be reused for genipin extraction. After evaporating butyl acetate, an off-white or slightly yellow powder was obtained. The powder contains 90.9% w/w of genipin.

Example 3

The genipin-rich extract made by the method in Example 2 was tested for stability. Genipin-rich powder, 0.20 g each, was sealed in vials and stored at 4° C. Samples were pulled at 0, 4 wks, 6 wks, and 12 wks, and genipin content was tested by using the HPLC method. Results are shown in Table 1.

TABLE 1

| Stability of genipin-rich extract | |
|---|---|
| Storage Time (wks) | Genipin, % w/w |
| 0 | 83.9 |
| 4 | 86.0 |
| 6 | 85.3 |
| 12 | 84.7 |

The genipin material was stable over the period of the test.

Example 4

Fifteen grams of genipin-rich extract made by the method in Example 1 was dissolved in 118.10 g of 10% ethanol solution. 16.89 g of 0.9 N solution of KOH was added to the above mixture and the genipin was hydrolyzed with stirring at room temperature (22° C.) for 7.5 hours. The pH of the hydrolyzed solution was adjusted to less than 4.0 with tartaric acid. The solution was heated to 74° C. for 15 min and cooled. The precipitate was filtered out through #2 filter paper. Next, the pH of the filtrate was adjusted to ~6.5 using calcium carbonate and the slurry was mixed for 10 minutes. The resulting precipitate was filtered off and the filtrate pH was adjusted to 4.0-4.5 by the addition of acetic acid. After alanine (4.50 g) was added, genipin red color was developed by heating to 82° C. for 2 hrs. The color was analyzed by taking 0.30 g of genipin red color and diluting to 30.0 g with DI water. L-, a-, and b-values were measured on a Hunter Lab spectrometer, and the absorption curve measured on a UV/VIS spectrometer. Results are shown in the following table.

| Parameters | Value |
|---|---|
| Hunter L-value | 27.86 |
| Hunter a-value | 10.21 |
| Hunter b-value | 2.26 |
| Wavelength (max, nm) | 550.09 |
| Absorption (max) | 0.67314 |

Example 5

Three grams of genipin-rich extract made by the method in Example 2 was dissolved in 23.5 g of 10% ethanol solution. 3.78 g of 1.0N solution of KOH was added to the above mixture and the genipin was hydrolyzed with stirring at room temperature (22° C.) for 8.0 hours. The pH of the hydrolyzed solution was adjusted to less than 4.0 with tartaric acid. The solution was heated to 74° C. for 15 minutes and cooled. The precipitate was removed by filtration on #2 filter paper. Next, the pH of the filtrate was adjusted to ~7.0 using calcium carbonate and the slurry was mixed for 15 minutes. The resulting precipitate was filtered off and the filtrate pH was adjusted to 4.0-4.5 by the addition of acetic acid. After alanine (1.20 g) was added, genipin red color was developed by heating to 84° C. for 2 hours. The color was analyzed by taking 0.50 g of genipin red color and diluting to 30.0 g with DI water. L-, a-, and b-values were measured on a Hunter Lab spectrometer, and the absorption curve measured on a UV/VIS spectrometer. Results are shown in the following table.

| Parameters | Value |
| --- | --- |
| Hunter L-value | 27.42 |
| Hunter a-value | 9.46 |
| Hunter b-value | 2.32 |
| Wavelength (max, nm) | 549.97 |
| Absorption (max) | 0.94423 |

Example 6

One and a half grams of genipin-rich extract made by the method in Example 2 was dissolved in 11.8 g of 10% ethanol solution. 1.97 g of 1.0N solution of KOH was added to the above mixture and the genipin was hydrolyzed with stirring at room temperature (22° C.) for 8.0 hours. The pH of the hydrolyzed solution was adjusted to less than 4.0 with tartaric acid. The solution was heated to 74° C. for 15 minutes and cooled. The precipitate was removed by filtration through #2 filter paper. Next, the pH of the filtrate was adjusted to ~7.0 using calcium carbonate and the slurry was mixed for 15 minutes. The resulting precipitate was filtered off and the filtrate pH was adjusted to 4.0-4.5 by the addition of acetic acid. After alanine (0.60 g), taurine (0.60 g), and magnesium chloride (0.4486 g) was added, a dark brown-black color was developed by heating to 84° C. for 2 hours. The color was analyzed by taking 1.0 g of genipin color and diluting to 30.0 g with DI water. L-, a-, and b-values were measured on a Hunter Lab spectrometer, and the absorption curve measured on a UV/VIS spectrometer. Results are shown in the following table.

| Parameters | Value |
| --- | --- |
| Hunter L-value | 24.73 |
| Hunter a-value | 0.29 |
| Hunter b-value | 0.85 |
| Wavelength (max, nm) | 542.83 |
| Absorption (max) | 0.0170 |
| Wavelength (2$^{nd}$ peak, nm) | 595.06 |
| Absorption (2$^{nd}$ peak) | 0.88795 |

Example 7

0.108 g of genipin-rich extract, made by the method in Example 2, was dispersed in 8.6 g of 8% ethanol aqueous solution in a test tube. Solids were completely dissolved after heating in a ~50° C. water bath. Then, 1.0 ml aliquots of the above genipin solution was put into test tubes separately and L-threonine 0.012 g, L-isoleucine 0.014 g, or L-histidine 0.016 g, respectively, were added. All test tubes were heated in an 80° C. water bath for 2 hours. The color was analyzed by taking 0.30 g of genipin color produced and diluting to 30.0 g with DI water. L-, a-, and b-values were measured on a Hunter Lab spectrometer, and the absorption curve measured on a UV/VIS spectrometer. Results are shown in the following table.

| Parameters | L-Throenine | L-Isoleucine | L-Histidine |
| --- | --- | --- | --- |
| Dilution (g/ml) | 0.50/100 | 0.30/100 | 0.10/100 |
| Color | Green | Green | Blue |
| Hunter L-value | 79.12 | 87.41 | 71.13 |
| Hunter a-value | −5.91 | −3.42 | −7.82 |
| Hunter b-value | −2.42 | −0.77 | −17.46 |
| Wavelength (max, nm) | 596.32 | 600.12 | 592.2 |
| Absorption (max) | 0.11914 | 0.06746 | 0.2537 |

Example 8

0.37 g of genipin-rich extract, made by the method in Example 2, was dispersed in 34.63 g of 10% ethanol aqueous solution in a beaker. Alanine 0.7 g, and xylose, 1.4 g, were added and dissolved. Sample heated at 92° C. for 1 hour. After cooling, the color was analyzed by taking 1.50 g of the color solution and diluting to 30.0 g with DI water. The color was observed to be orange-red in contrast to the red color observed when alanine was mixed alone with the genipin-rich extract. L-, a-, and b-values were measured on a Hunter Lab spectrometer, and the results are shown in the following table.

| Parameters | L-Alanine and Xylose |
| --- | --- |
| Color | Orange-Red |
| Hunter L-value | 25.12 |
| Hunter a-value | 2.48 |
| Hunter b-value | −0.22 |

What is claimed is:

1. A method of preparing a genipin-rich red colorant from *Genipa americana* comprising:
   (a) extracting a *Genipa americana* fruit source selected from the group consisting of *Genipa americana* whole fruit, fruit juice, fruit puree, fruit juice concentrate, dried powder forms of the fruit and juice, water-insoluble parts of the fruit, and mixtures thereof, with a solvent selected from water, organic solvents, and mixtures thereof, to produce a genipin-rich extract;
   (b) hydrolyzing the genipin-rich extract for 30 minutes to 24 hours to produce a hydrolyzed extract;
   (c) adjusting the pH of the hydrolyzed extract to about 3.5-5.0, to produce an acidified solution;
   (d) heating the acidified solution to 65 to 85° C. for about 5 to 120 minutes to produce a brown-colored precipitate and removing the precipitate to produce a clear solution,
   (e) adjusting the pH of the clear solution to about 4-4.6,
   (f) mixing the solution of step (e) with one or more compounds having a primary amine group in the presence of an organic acid or salt thereof, under anaerobic conditions, for a sufficient time and temperature to produce the genipin-rich red colorant.

2. The method according to claim 1 wherein the colorant is further purified and concentrated using an ion exchange column and/or a membrane filter.

3. The method according to claim 1 wherein the one or more compounds having a primary amine group is an amino acid selected from alanine, arginine, lysine, glutamic acid, and mixtures thereof.

4. The method of claim 1 wherein the organic solvent is selected from ethyl acetate, butyl acetate, n-butanol, diethyl ether, hexane, 2-butanone, chloroform, 1,2-dichloroethane, xylene, methyl-t-butyl ether, toluene, carbon tetrachloride, trichloroethylene, cyclohexane, pentane, heptane and mixtures thereof.

\* \* \* \* \*